J. HÄRDEN.
ARC LIGHT ELECTRODE.
APPLICATION FILED DEC. 10, 1903.
1,019,464.
Patented Mar. 5, 1912.
Witnesses:
Inventor:
Johannes Härden,
by
Att'y.

UNITED STATES PATENT OFFICE.

JOHANNES HÄRDÉN, OF SCHENECTADY, NEW YORK, ASSIGNOR TO GENERAL ELECTRIC COMPANY, A CORPORATION OF NEW YORK.

ARC-LIGHT ELECTRODE.

1,019,464.  Specification of Letters Patent.  Patented Mar. 5, 1912.

Application filed December 10, 1903. Serial No. 184,565.

*To all whom it may concern:*

Be it known that I, JOHANNES HÄRDÉN, a subject of the King of Sweden and Norway, residing at Schenectady, in the county of Schenectady and State of New York, have invented certain new and useful Improvements in Arc-Light Electrodes, of which the following is a specification.

The object of my present invention is the provision of an arc light electrode which gives an efficient luminous or flaming arc and which possesses other features fitting it for use in an arc lamp.

I have found that an electrode containing more or less ferro-manganese, which may or may not be associated with titanium carbid, rutile, magnetite or certain other materials, possesses these characteristics.

In the accompanying drawing I have shown in elevation an electrode made in accordance with my invention.

In forming electrodes out of mixtures of ferro-manganese with other substances, the materials employed may be associated in varying proportions and in different ways. In particular I have found that an electrode formed from a powdered mixture containing substantially 40 parts of titanium carbid, 40 parts of ferro-manganese and 20 parts of carbon which is moistened with a suitable binder (which may consist of water and oil), to render it plastic, gives satisfactory results. From the plastic mass thus formed electrodes may be molded into the form of pencils or the like, after which they are baked for some time at a temperature of from 200° to 300° C., to remove the moisture contained in them. After removing the moisture from the electrodes, they are fired some time at a temperature of from 1200° to 1300° C. The electrodes thus formed give good flaming or luminous arcs having a slightly bluish tinge, are but slowly consumed in the normal operation of the lamps, in which they may be employed, and do not form slags at their tips which are non-conducting when cold. Such electrodes work more satisfactorily in direct than in alternating current circuits. They can, however, be employed in either kind of circuit.

It will, of course, be understood that the method above specified is but one of many in which electrodes containing ferro-manganese may be formed.

In the ferro-manganese which I employ in the manufacture of arc light electrodes the iron and manganese may be combined in proportions varying from 60 parts of iron and 40 parts of manganese to 90 parts of iron and 10 parts of manganese. I prefer, however, to employ ferro-manganese composed of from 30 to 40 parts of manganese and from 70 to 60 parts of iron.

What I claim as new and desire to secure by Letters Patent of the United States, is,

1. An arc light electrode containing titanium carbid, ferro-manganese, and carbon.

2. An arc light electrode, containing two parts of titanium carbid, two parts of ferro-manganese, and one part of carbon.

3. An arc light electrode, consisting of forty per cent. of titanium carbid, forty per cent. of ferro-manganese, and twenty per cent. of carbon.

In witness whereof, I have hereunto set my hand this third day of December, 1903.

JOHANNES HÄRDÉN.

Witnesses:
BENJAMIN B. HULL,
HELEN ORFORD.